United States Patent
Chen et al.

(10) Patent No.: US 9,867,072 B2
(45) Date of Patent: Jan. 9, 2018

(54) DETERMINATION OF SUBFRAME TYPE FOR SUBFRAMES CONTAINING DISCOVERY SIGNALS

(71) Applicant: QUALCOMM Incorporated, San Diego, CA (US)

(72) Inventors: Wanshi Chen, San Diego, CA (US); Aleksandar Damnjanovic, Del Mar, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 110 days.

(21) Appl. No.: 14/846,447

(22) Filed: Sep. 4, 2015

(65) Prior Publication Data

US 2016/0088500 A1   Mar. 24, 2016

Related U.S. Application Data

(60) Provisional application No. 62/053,077, filed on Sep. 19, 2014.

(51) Int. Cl.
*H04L 5/00* (2006.01)
*H04W 24/08* (2009.01)
(Continued)

(52) U.S. Cl.
CPC .......... *H04W 24/08* (2013.01); *H04B 7/0626* (2013.01); *H04L 5/005* (2013.01);
(Continued)

(58) Field of Classification Search
CPC ..... H04W 24/02–24/10; H04W 72/005; H04L 5/0048–5/0057; H04L 5/14
See application file for complete search history.

(56) References Cited

U.S. PATENT DOCUMENTS

| | | | | |
|---|---|---|---|---|
| 2014/0334350 | A1* | 11/2014 | Suzuki | H04W 72/005 370/280 |
| 2015/0312789 | A1* | 10/2015 | You | H04L 1/0693 370/252 |
| 2016/0315740 | A1* | 10/2016 | Yi | H04W 72/005 |

OTHER PUBLICATIONS

Alcatel-Lucent, et al., "DRS Measurement Impact", 3GPP Draft, R2-143654, DRS Measurement Impact, 3rd Generation Partnership Project (3GPP), vol. RAN WG2, no. Dresden, Germany, Aug. 18, 2014-Aug. 22, 2014, Aug. 17, 2014 (Aug. 17, 2014), pp. 1-4, XP050794624, Retrieved from the Internet: URL: http://www.3gpp.org/ftp/Meetings_3GPP_SYNC/RAN2/Docs/ [retrieved on Aug. 17, 2014].

(Continued)

*Primary Examiner* — Marcus R Smith
(74) *Attorney, Agent, or Firm* — Nerrie M. Zohn

(57) ABSTRACT

A method, an apparatus, and a computer program product for wireless communication are provided. The apparatus determines a subframe type for a neighbor cell(s), for example, to perform CRS based measurements for the neighbor cell(s). The UE determines whether a CRS is present in subframe(s) of a duration of a DRS for the neighbor cell(s) based on TDD configuration and an MBSFN configuration of a serving cell and at least one of received neighbor cell configuration information indicating at least one of a TDD configuration and a configuration of neighboring cell(s), received configuration of DRSs for neighboring cell(s), the configuration including at least a starting subframe index for the DRS and a duration of the DRS.

32 Claims, 16 Drawing Sheets

(51) Int. Cl.
*H04B 7/06* (2006.01)
*H04W 48/12* (2009.01)
*H04L 5/14* (2006.01)
*H04W 84/04* (2009.01)
*H04W 24/10* (2009.01)

(52) U.S. Cl.
CPC .......... *H04L 5/0051* (2013.01); *H04L 5/0092* (2013.01); *H04L 5/1469* (2013.01); *H04W 48/12* (2013.01); *H04L 5/0048* (2013.01); *H04W 24/10* (2013.01); *H04W 84/042* (2013.01)

(56) References Cited

OTHER PUBLICATIONS

Catt, et al., "WF on DRS measurement for TDD", 3GPP Draft, R1-143593, 3rd Generation Partnership Project (3GPP), Mobile Competence Centre, 650, Route Des Lucioles, F-06921 Sophia-Antipolis Cedex, France, vol. RAN WG1, no. Dresden, Germany, Aug. 18, 2014-Aug. 22, 2014, Aug. 27, 2014 (Aug. 27, 2014), 3 Pages, XP050815961, Retrieved from the Internet: URL: http://www.3gpp.org/ftp/tsg_ran/WG1_RL1/TSGR1_78/Docs/ [retrieved on Aug. 27, 2014].

Catt, et al., "WF on DRS Measurement for TDD", 3GPP Draft, R1-143632, 3rd Generation Partnership Project (3GPP), vol. RAN WG1, no. Dresden, Germany, Aug. 18, 2014-Aug. 22, 2014, Aug. 27, 2014 (Aug. 27, 2014), 2 Pages, XP05015987, Retrieved from the Internet: URL: http://www.3gpp.org/ftp/tsg_ran/WG1_RL1/TSGR1_78/Docs/ [retrieved on Aug. 27, 2014].

Catt: "Procedures for Discovery Signal based RRM Measurements", 3GPP Draft, R1-142884, 3rd Generation Partnership Project (3GPP), vol. RAN WG1, no. Dresden, Germany, Aug. 18, 2014-Aug. 22, 2014, Aug. 17, 2014, (Aug. 17, 2014), 4 Pages, XP050788368, Retrieved from the Internet: URL: http://www.3gpp.org/ftp/Meetings_3GPP_SYNC/RAN1/Docs/ [retrieved on Aug. 17, 2014].

International Search Report and Written Opinion—PCT/US2015/049027—ISA/EPO—dated Dec. 18, 2015.

NTT DOCOMO: "Views on Detailed Design of Discovery Signal for Rel. 12 Discovery Procedure", 3GPP Draft, R1-142259 Views on Discovery Signal Design_R2, 3rd Generation Partnership Project (3GPP), vol. RAN WG1, no. Seoul, Korea, May 19, 2014-May 23, 2014, May 18, 2014 (May 18, 2014), pp. 1-6, XP050789376, Retrieved from the Internet: URL: http://www.3gpp.org/ftp/Meetings_3GPP_SYNC/RAN1/RAN1/Docsj [retrieved on May 18, 2014].

RAN WG1: "LS on RAN1 Agreements on DRS Design", 3GPP Draft, R1-142775, 3rd Generation Partnership Project (3GPP), vol. RAN WG1, no. Seoul, Korea, May 19, 2014-May 23, 2014, Jun. 19, 2014 (Jun. 19, 2014), 2 Pages, XP050815134, Retrieved from the Internet: URL: http://www.3gpp.org/ftp/tsg_ran/WG1_RL1/TSGR1_77/Docs/ [retrieved on Jun. 19, 2014].

* cited by examiner

Uplink-downlink configurations.

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 11

DETERMINATION OF SUBFRAME TYPE FOR SUBFRAMES CONTAINING DISCOVERY SIGNALS

CROSS-REFERENCE TO RELATED APPLICATION

This application claims the benefit of U.S. Provisional Application Ser. No. 62/053,077, entitled "Determination of Subframe Type for DRS in Small Cells in LTE" and filed on Sep. 19, 2014, which is expressly incorporated by reference herein in its entirety.

FIELD

The present disclosure relates generally to communication systems, and more particularly, to determination of a subframe type for discovery reference signals (DRSs) in small cells in LTE.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Discovery Reference Signals (DRS) may be helpful to a user equipment (UE) to discover its surrounding cells. For example, in a macro area, small cells may be deployed to boost system performance and bandwidth. A UE may use DRS to discover neighbor cells (e.g., small cells, femto cells, pico cells, etc.). DRS detection may assist in load balancing, interference coordination including on/off operation of small cells, autonomous configuration of a new cell, mobility, robustness, etc. A Cell-Specific Reference Signal (CRS) may be transmitted within a DRS occasion. However, there is currently no way for a UE to determine the type of subframe transmitted by a neighbor cells. Determining the subframe type transmitted may be beneficial to, for example, perform CRS based measurement.

Aspects presented herein improve efficiency in performing CRS measurement for a neighbor cell by enabling the UE to determine a subframe type for the neighbor cell. The UE determines a subframe type for the neighbor cell using at least one of a configured number of subframes for a DRS occasion for a carrier frequency, a neighbor cell configuration for a carrier frequency, a serving cell's Time Division Duplex (TDD) configuration, Channel State Information-Reference Signal (CSI-RS) configuration for a cell, a Downlink Pilot TimeSlot (DwPTS) configuration of the serving cell, or a Secondary Synchronization Signal subframe index for a carrier frequency. The UE may then use the determination of the subframe type in order to perform CRS based measurement for the neighbor cell.

In an aspect of the disclosure, a method, a computer program product, and an apparatus are provided. The apparatus determines a TDD configuration and a Multimedia Broadcast Single Frequency Network (MBSFN) configuration of a serving cell, receives neighbor cell configuration information indicating at least one of a TDD configuration and a configuration of one or more neighboring cells, receives a configuration of DRSs for at least one of the one or more neighboring cells, the configuration including at least a starting subframe index for the DRS and a duration of the DRS, determines whether a CRS is present in one or more subframes of the duration of the DRS for the at least one of the one or more neighbor cells based on at least one of the received neighbor cell configuration information, the TDD configuration and the MBSFN configuration of the serving cell, the starting subframe index for the DRS, and the duration of the DRS.

BRIEF DESCRIPTION OF THE DRAWINGS

FIG. 11 is a diagram 1100 illustrating subframe configurations for a TDD frame structure.

DETAILED DESCRIPTION

Figure 1:
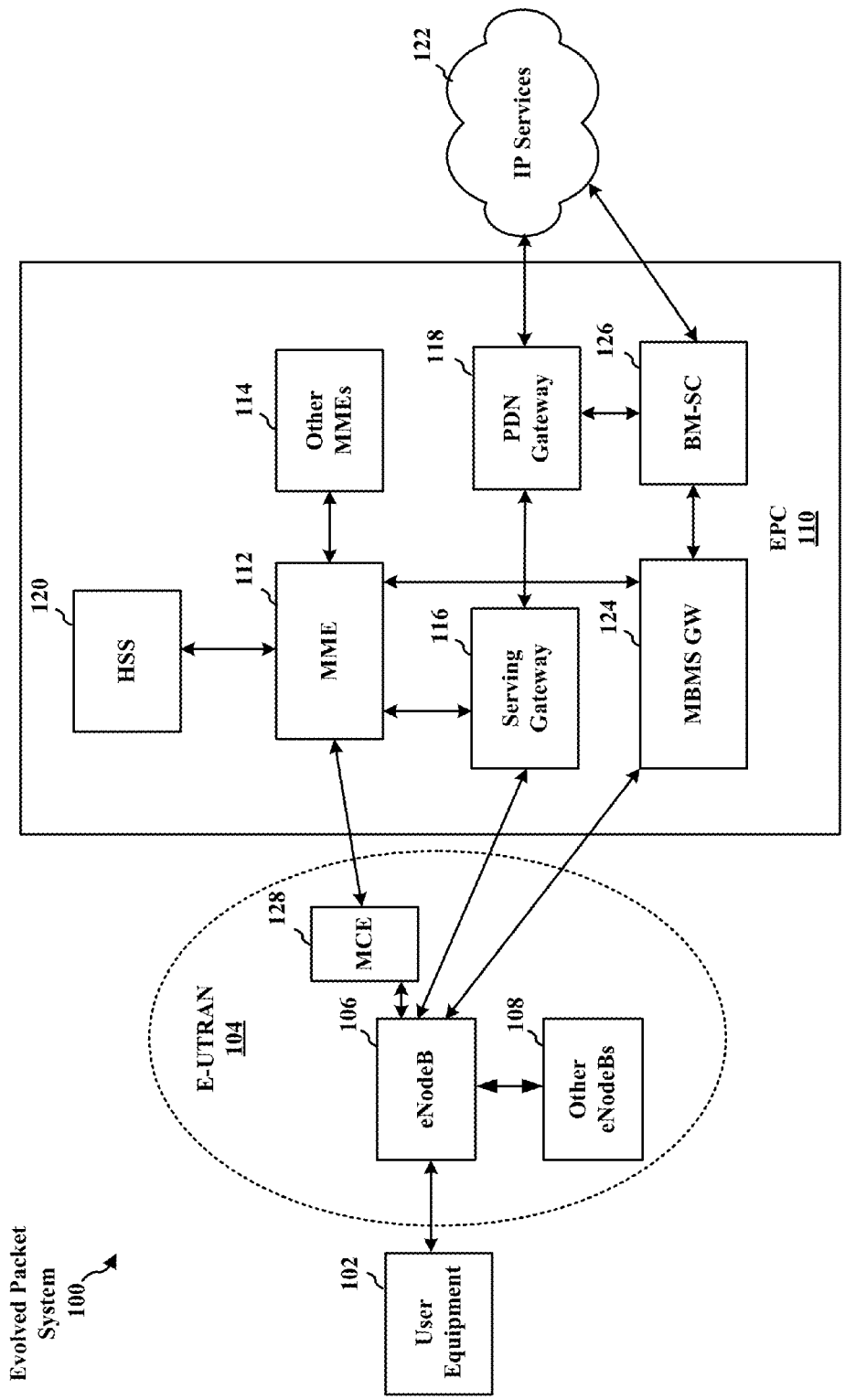
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer-executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a public land mobile network (PLMN), and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
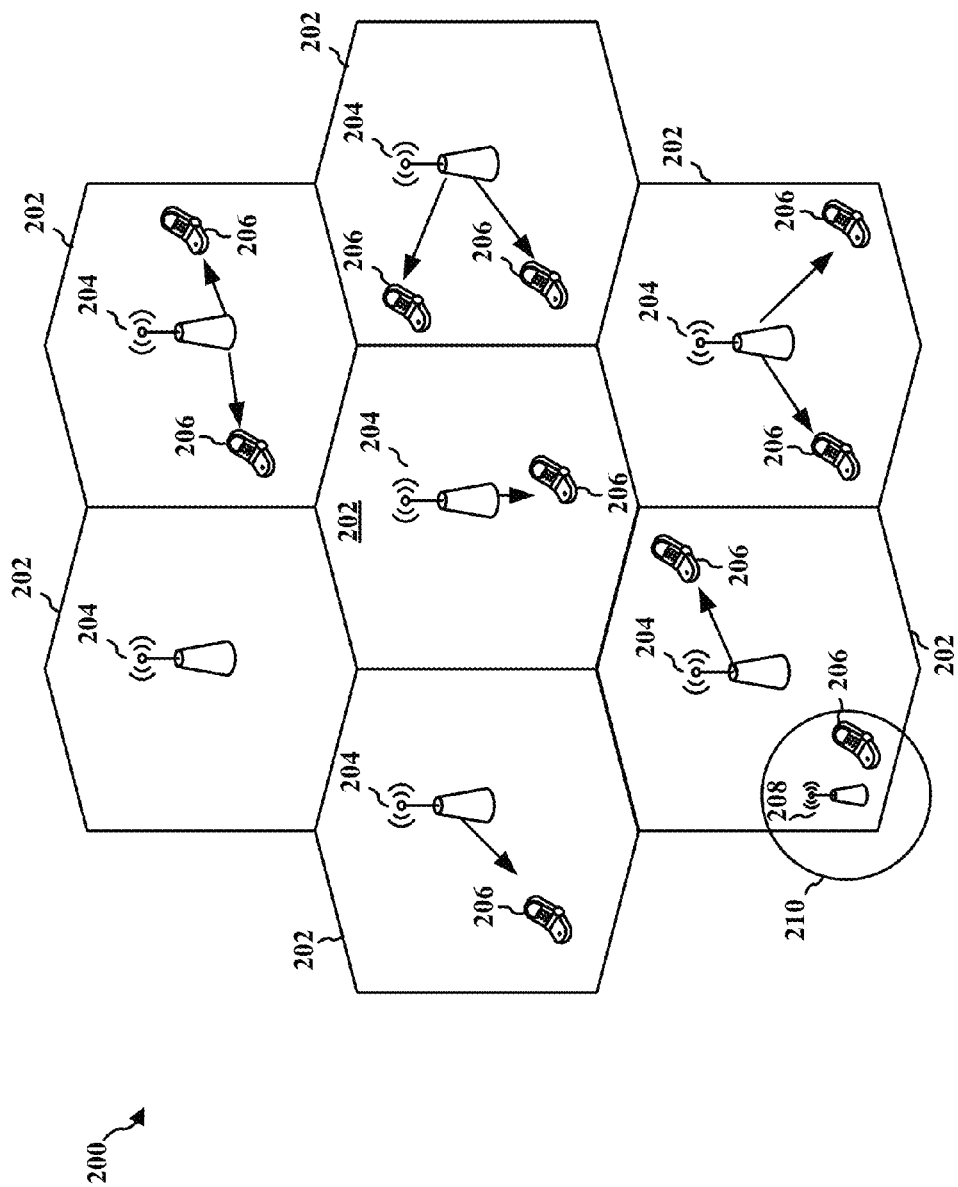
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
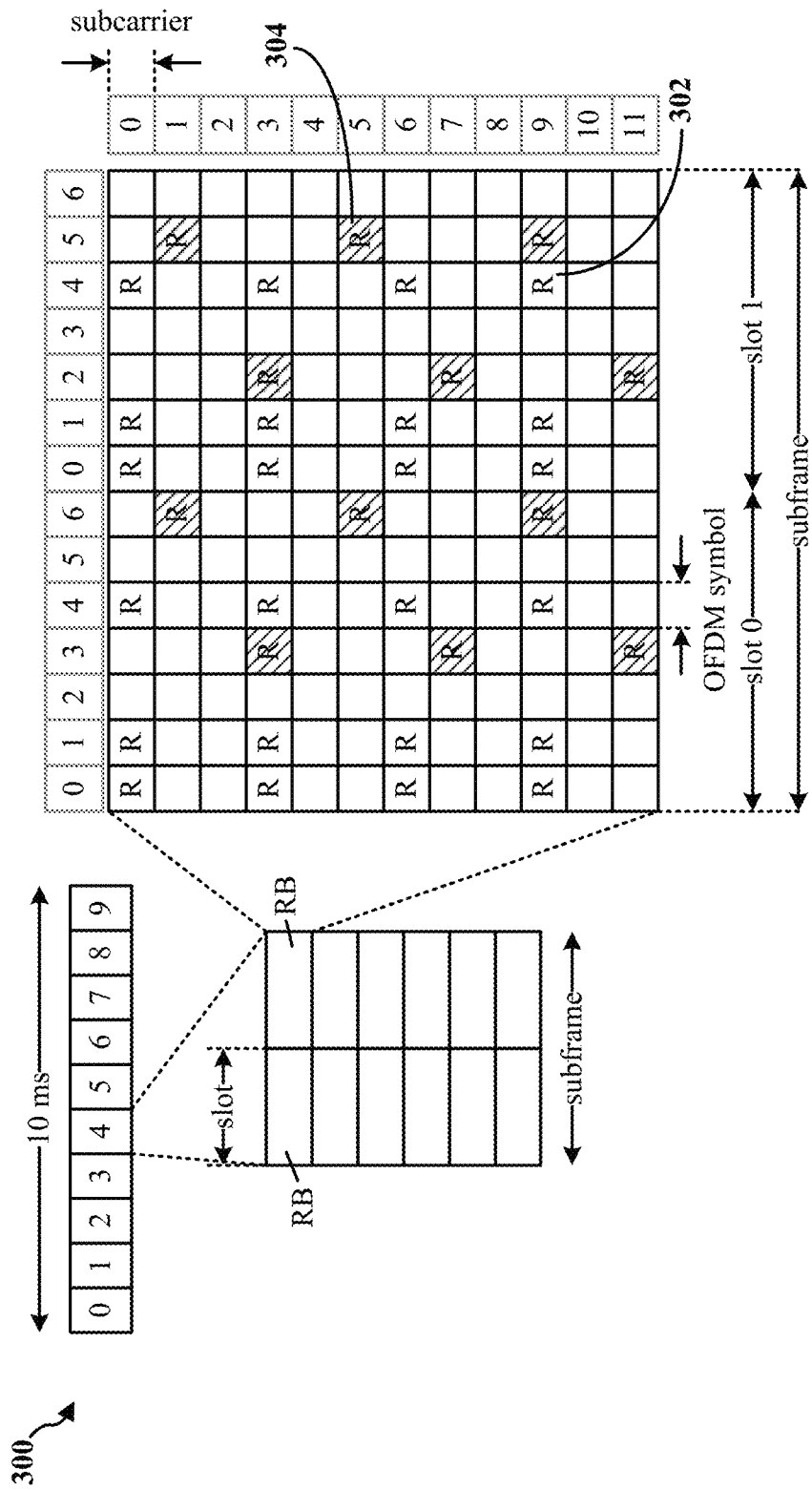
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
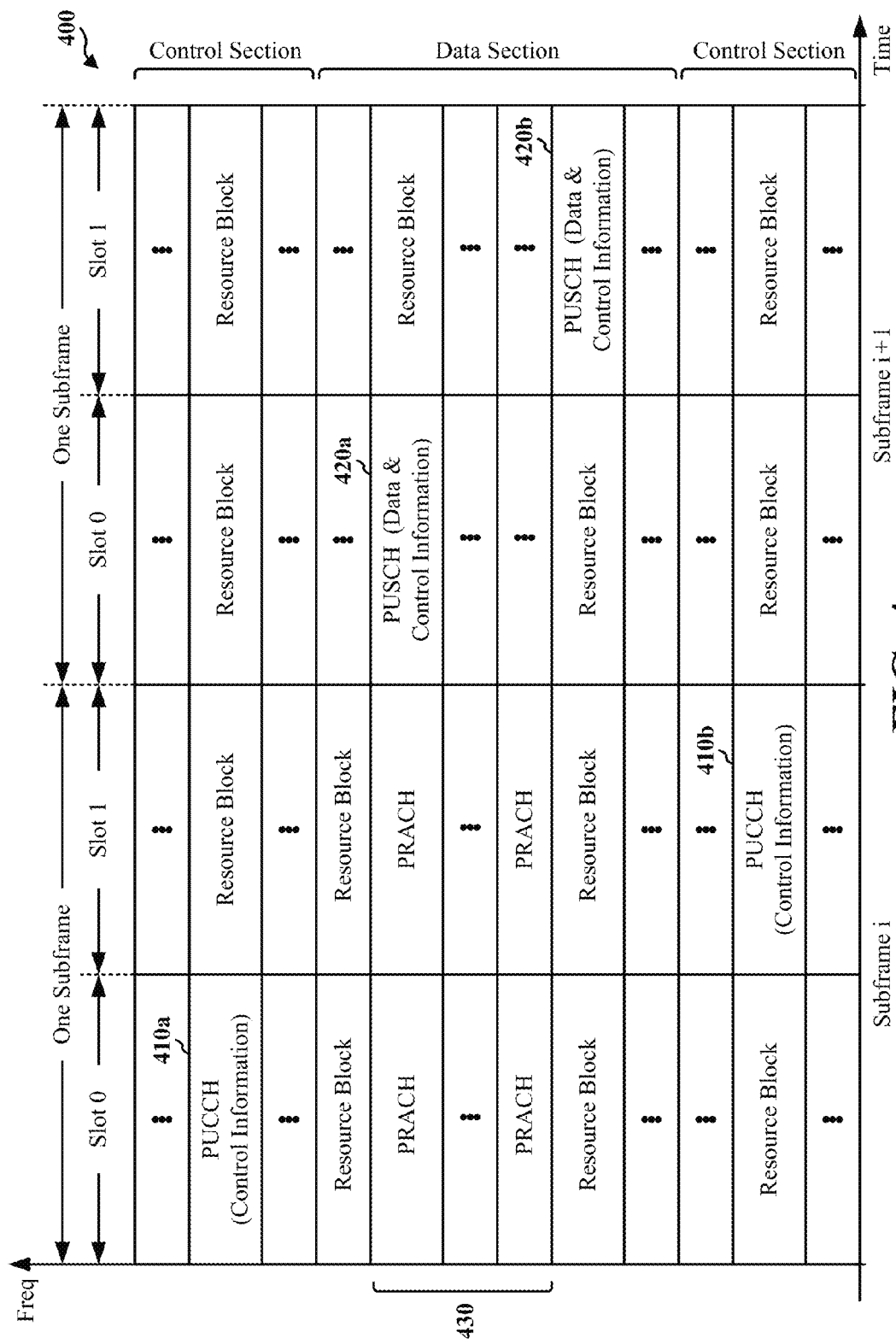
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
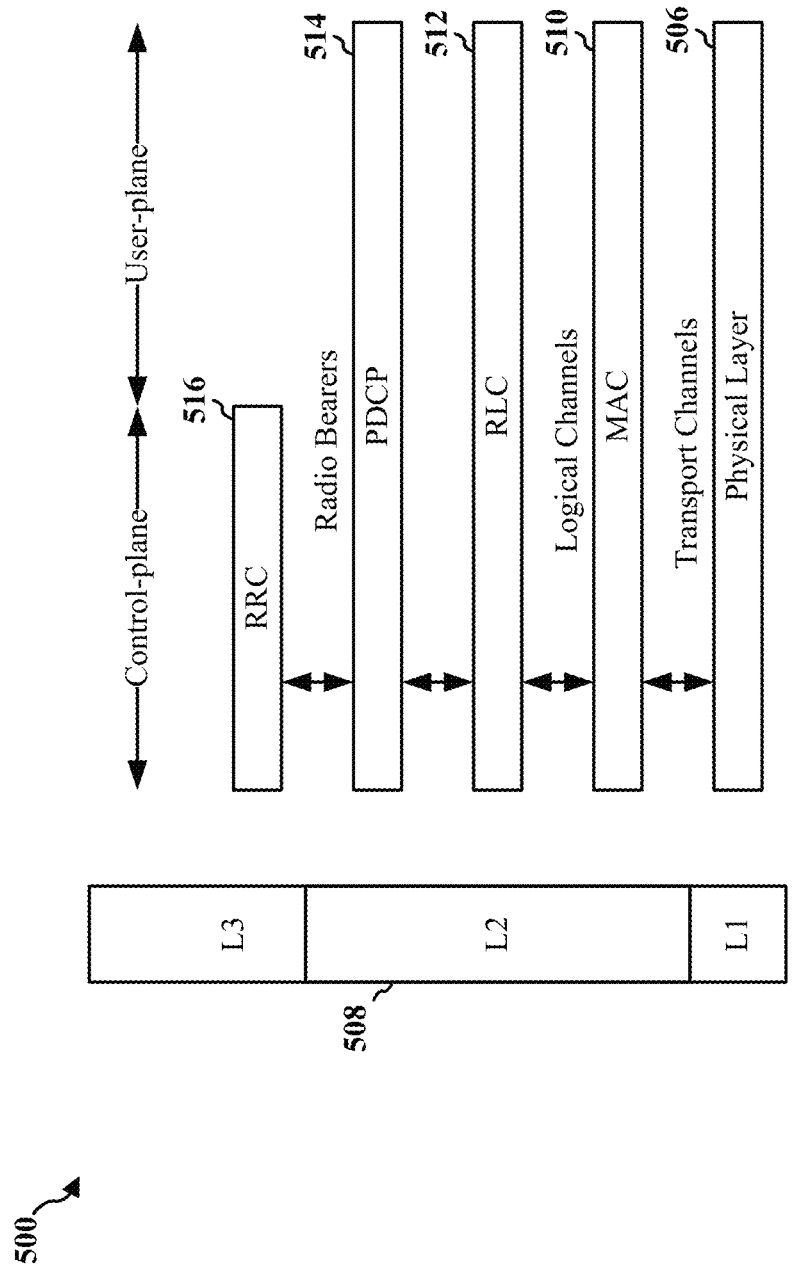
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARM). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
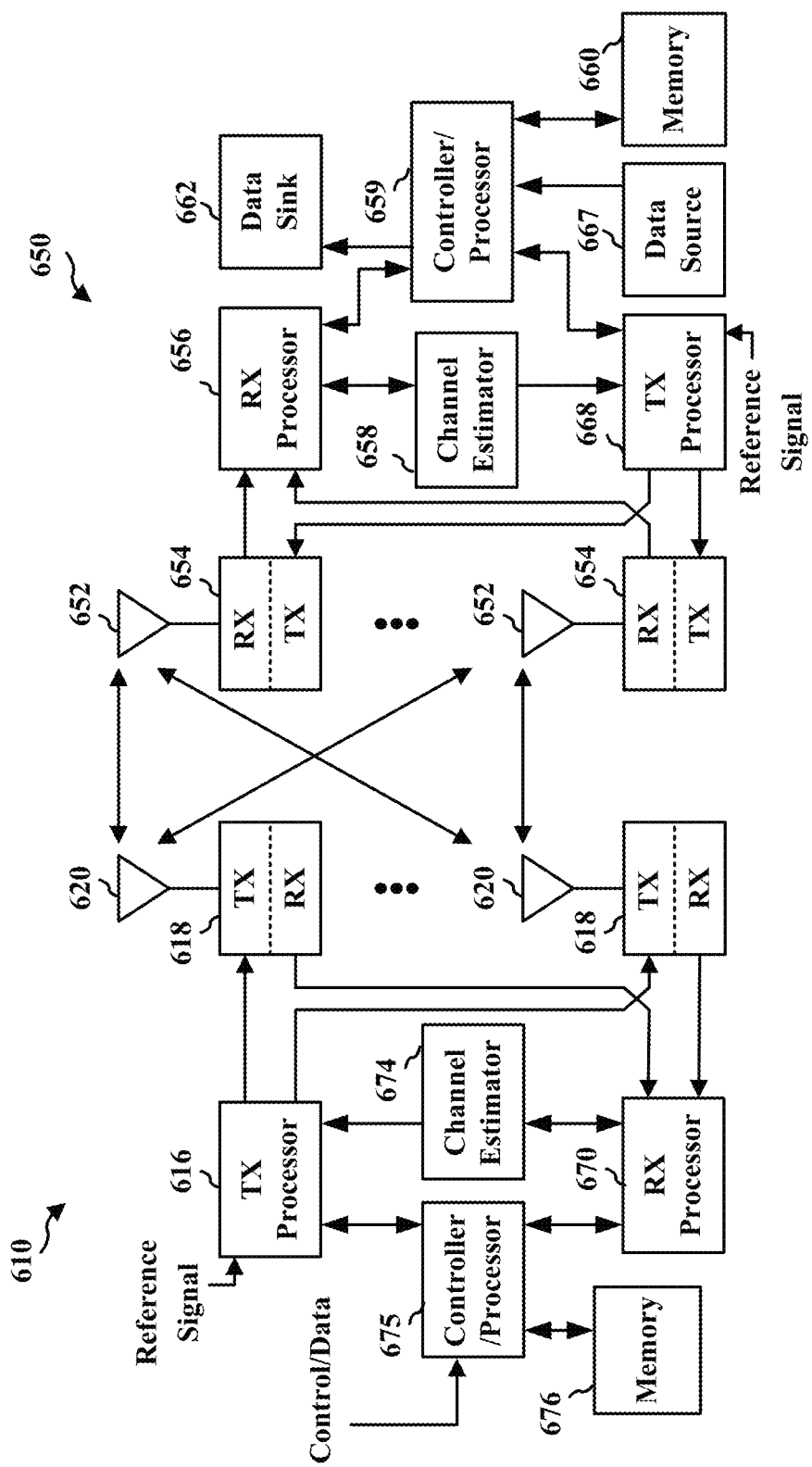
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Small cell densification (e.g., increasing the number of proximate small cells within a macro area) may be implemented to boost performance in a mobile communication network. To facilitate management of the small cells, the small cells may be configured to transmit discovery reference signals (DRS) that enable a UE to discover its surrounding small cells. The use of DRSs may help to achieve load balancing and interference coordination (including on/off operation), autonomous configuration of a new small cell, mobility robustness, etc.

Figure 7:
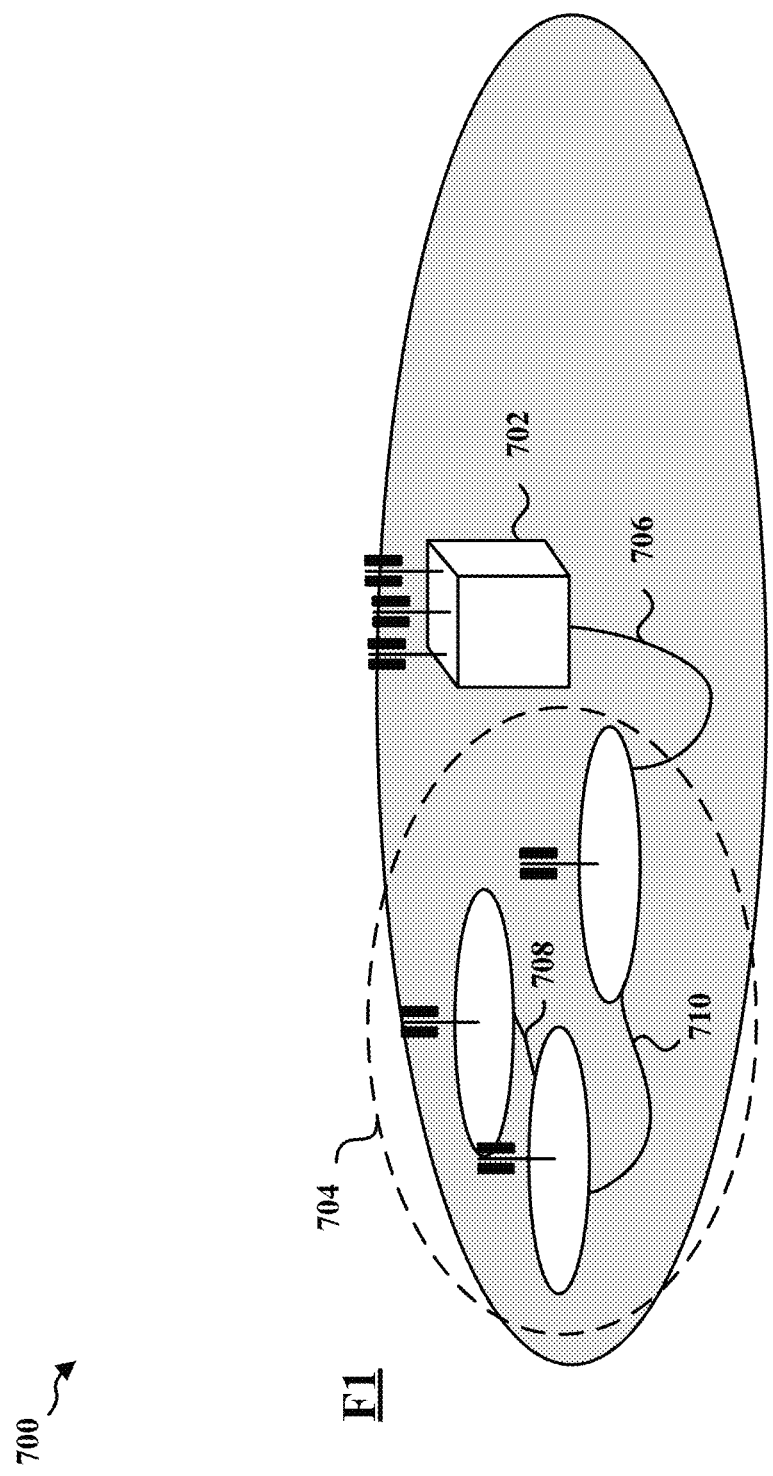
FIG. 7 is a diagram illustrating an example small cell deployment configuration.

FIG. 7 is a diagram 700 illustrating an example small cell deployment configuration. FIG. 7 shows an outdoor deployment of a macro cell 702 and small cells 704. As shown in FIG. 7, the small cells 704 are coupled to one another through backhaul links 708 and 710. As further shown in FIG. 7, the small cells 704 are coupled to the macro cell 702 thorough backhaul link 706. In the configuration of FIG. 7, the macro cell 702 and small cells 704 share a frequency band (e.g., frequency band F1).

Figure 8:
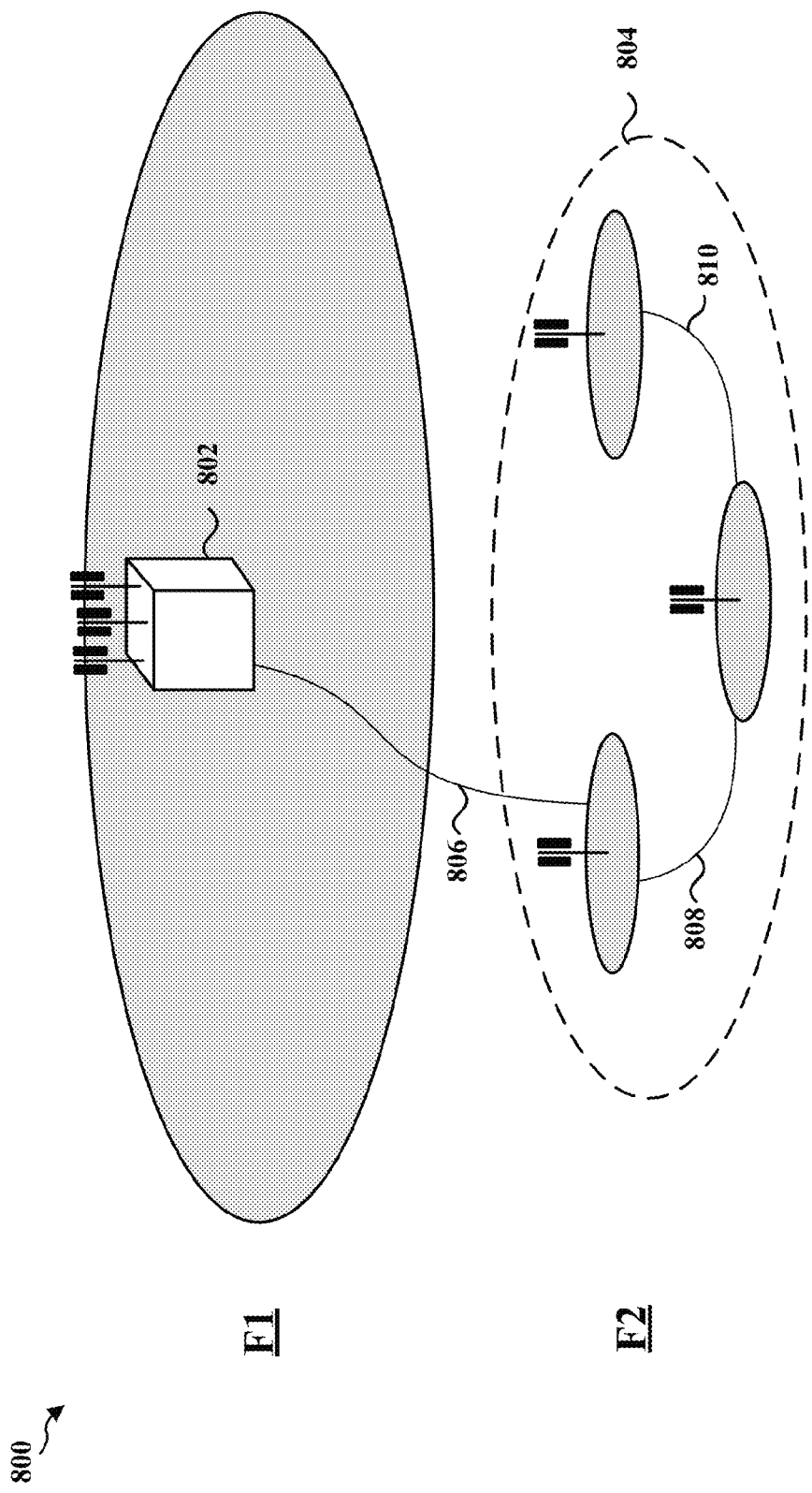
FIG. 8 is a diagram illustrating an example small cell deployment configuration.

FIG. 8 is a diagram 800 illustrating an example small cell deployment configuration. FIG. 8 shows an outdoor deployment of a macro cell 802 and small cells 804. The macro cell 802 and small cells 804 may have overlapping geographical coverage. As shown in FIG. 8, the small cells 804 are coupled to one another through backhaul links 808 and 810. As further shown in FIG. 8, the small cells 804 are coupled to the macro cell 802 thorough backhaul link 806. In the configuration of FIG. 8, the macro cell 802 uses a first frequency band (e.g., frequency band F1) and the small cells 804 use a second frequency band (e.g., frequency band F2) different from the first frequency band.

Figure 9:
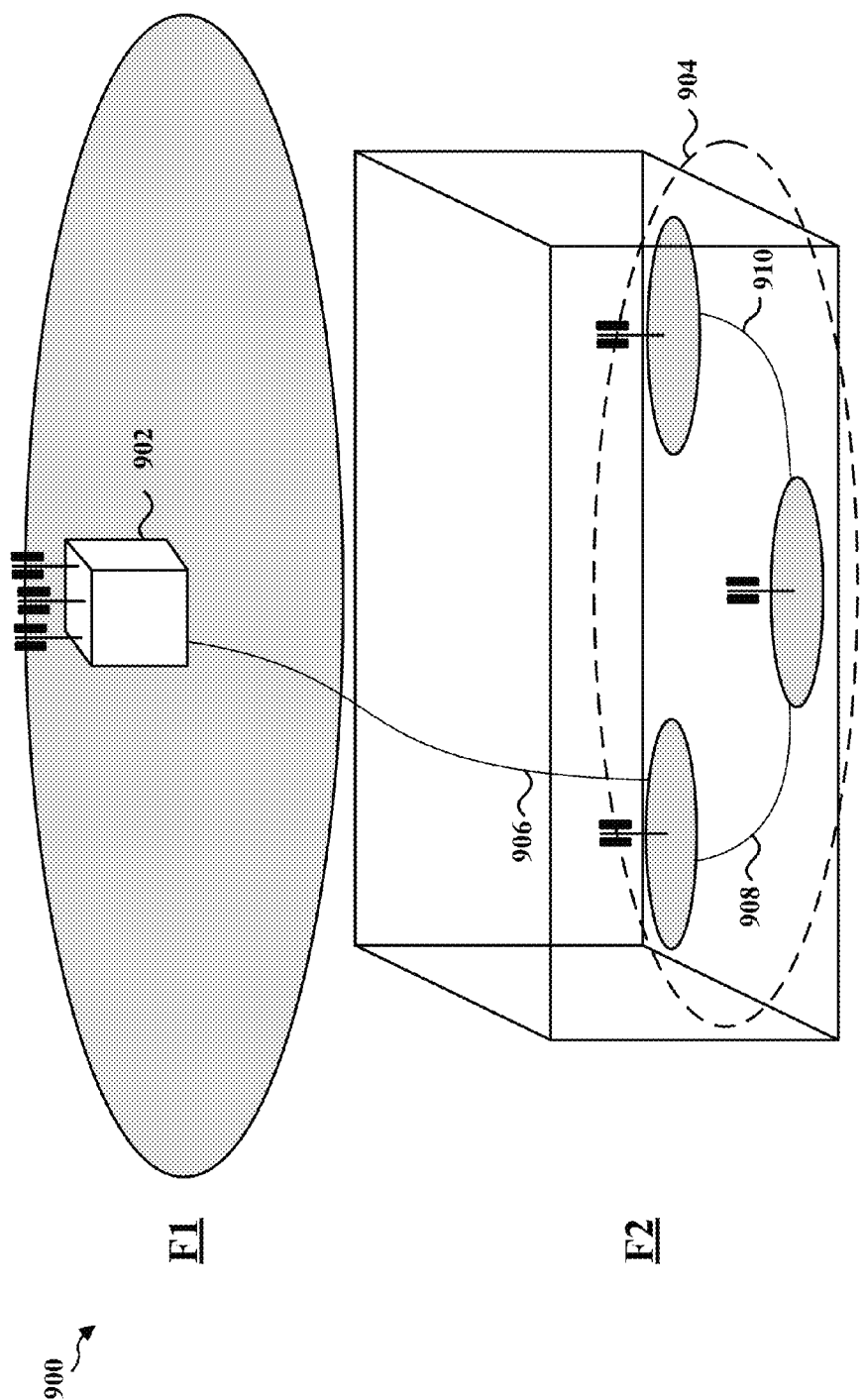
FIG. 9 is a diagram illustrating an example small cell deployment configuration.

FIG. 9 is a diagram 900 illustrating an example small cell deployment configuration. FIG. 9 shows a macro cell 902 that is deployed outdoors and small cells 904 that are deployed indoors. As shown in FIG. 9, the small cells 904 are coupled to one another through backhaul links 908 and 910. As further shown in FIG. 9, the small cells 904 are coupled to the macro cell 902 thorough backhaul link 906. In the configuration of FIG. 9, the macro cell 902 uses a first frequency band (e.g., frequency band F1) and the small cells 904 use a second frequency band (e.g., frequency band F2) different from the first frequency band.

Figure 10:
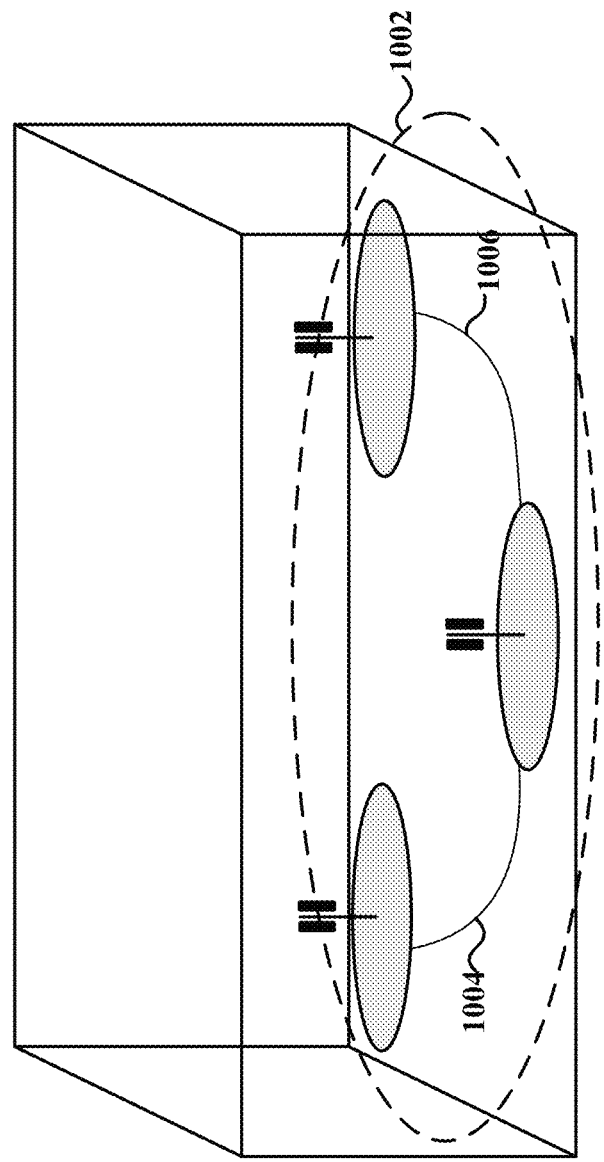
FIG. 10 is a diagram illustrating an example small cell deployment configuration.

FIG. 10 is a diagram 1000 illustrating an example small cell deployment configuration. FIG. 10 shows small cells 1002 that are deployed indoors. As shown in FIG. 10, the small cells 1002 are coupled to one another through backhaul links 1004 and 1006. In the configuration of FIG. 10, the small cells 1002 use either a first frequency band (e.g., frequency band F1) or a second frequency band (e.g., frequency band F2). In the configurations of FIGS. 7 through 10, the users may be distributed both for outdoor and indoor deployments.

FIG. 11 is a diagram 1100 illustrating subframe configurations for a TDD frame structure. As described supra, in addition to FDD, TDD frame structure is supported in LTE. A TDD frame structure may support seven possible subframe configurations (e.g., UL-DL subframe configurations 0-6). The subframe configurations have one of two possible switching periodicities (e.g., 5 ms and 10 ms). As shown in FIG. 11, the subframe configurations with a 5 ms switching periodicity include two special subframes (e.g., indicated as "S" in FIG. 11) per frame and the subframe configurations with a 10 ms switching periodicity include one special subframe per frame.

Figure 12:
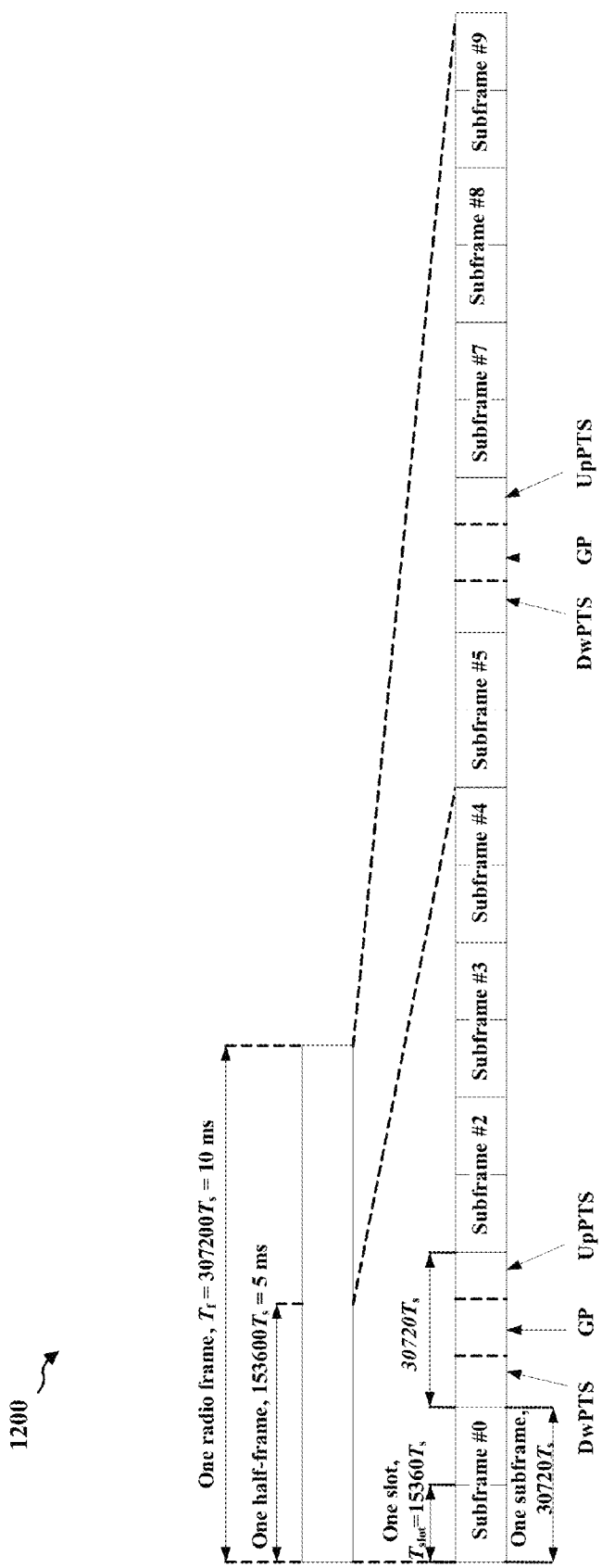
FIG. 12 is a diagram 1200 illustrating an LTE frame structure.

FIG. 12 is a diagram 1200 illustrating an LTE frame structure in accordance with various aspects of the present disclosure. As shown in FIG. 12, one radio frame may be configured to include 10 subframes (e.g., subframe 0 through subframe 9). As further shown in FIG. 12, each subframe may include two slots. In an aspect, the radio frame in FIG. 12 may be configured with a subframe configuration from the seven subframe configurations (e.g., UL-DL configurations 0-6) previously described with respect to FIG. 11. For example, if the radio frame in FIG. 12 is configured with subframe configuration 3 in FIG. 11, subframes 0 and 5-9 may be configured as DL subframes, subframes 2-4 may be configured as UL subframes, and subframe 1 may be configured as a special subframe.

A DRS can only be transmitted in a downlink subframe or a downlink pilot time slot (DwPTS) region of a special subframe. A DRS occasion for a cell may include N consecutive subframes and the duration of the DRS occasion may be the same for all cells on one frequency. In an FDD frame, the duration of the DRS occasion may be within a range of one to five subframes and may be signaled per frequency to UEs. In a TDD frame, the duration of the DRS occasion may be within a range of two to five subframes and may be signaled per frequency to UEs. Secondary synchronization signals (SSS) may occur in the first subframe of a DRS occasion. For example, a DRS occasion (e.g., a DRS transmission) for a cell may occur every M ms (e.g., M=40, 80, 160, etc.).

A UE may assume the presence of a primary synchronization signal (PSS), an SSS, and/or a CRS in a DRS. A CRS is transmitted at least in the same subframe(s) as PSS/SSS. A UE may be indicated a list of CRSs with different cell IDs. Thus, a list of CRSs with different cell IDs may be signaled to the UE. A channel state information reference signal (CSI-RS) is assumed to be present in DRS for measurement if configured by higher layers. A DRS occasion may include multiple CSI-RS RE configurations associated with a CRS. The different CSI-RS configurations may be in the same subframes, different subframe(s), or may be scrambled independently.

A UE may be configured with up to at least four different DRS measurement timing configurations (DMTCs) across all frequencies for which the UE is configured to measure DRS. Signaling of a DMTC (for a frequency) includes DMTC periodicity and offset. If a UE is configured with multiple DMTCs, then all the DMTCs may be configured with the same period for inter-frequency measurement. A DMTC may be common to multiple carriers. If a UE is configured with a measurement gap and to measure DRS for intra-frequency and inter-frequency measurements, at least two DMTCs with different offsets may be configured. On any carrier frequency, a UE may expect that all cells/TPs (that transmit DRS) transmit DRS in every measurement opportunity indicated by the DMTC.

In addition to the DMTC, existing signaling techniques may be reused, such as a maximum allowed measurement bandwidth (e.g., 6, 15, 25, 50, 75, 100 RBs), or the MBSFN subframe configuration and TDD UL-DL subframe configuration of a neighbor cell.

In an aspect, the neighbor cell configuration (also referred to as a NeighCellConfig field or a NeighCellConfig value) may comprise a two-bit value that provides information related to the MBSFN and TDD UL/DL subframe configuration of neighbor cells of a frequency. For example, a value '00' of the neighbor cell configuration may indicate that not all neighbor cells have the same MBSFN subframe allocation as the serving cell on the frequency, if configured, and as the PCell otherwise; a value '01' may indicate that no MBSFN subframes are present in all neighbor cells; a value '10' may indicate that the MBSFN subframe allocations of all neighbor cells are identical to or subsets of that in the serving cell on the frequency, if configured, and of that in the PCell otherwise; a value '11' may indicate a different UL/DL allocation in neighboring cells for TDD compared to the serving cell on the frequency, if configured, and compared to the PCell otherwise. For TDD, the values '00', '10', and '01' are only used for same UL/DL allocation in neighboring cells compared to the serving cell on the frequency, if configured, and compared to the PCell otherwise.

A restricted radio resource management (RRM) measurement configuration for a Pcell may be configured together with measurements on DRS. If a UE is configured with DMTC and with the existing restricted RRM measurement configurations for a frequency, the UE may measure DRS in subframes indicated by the restricted RRM measurement configuration.

For DRS-based measurement, a UE may be configured to assume a CRS transmission in an MBSFN subframe. However, there may be no additional signaling associated with MBSFN configurations. Both CRS and CSI-RS (if configured) based RSRP (discovery RSRP or DRSRP) measurement may be supported. For CRS based measurement, a UE may assume port 0 CRS is transmitted in DRS. While CRS based RSRQ measurement may be supported, CSI-RS-based RSRQ measurement may not be specified. For DRS-based RSSI measurement, discovery RSSI (DRSSI) is measured over all OFDM symbols in the DL portion of measurement subframes within a DRS occasion. For a DRS-based RSRQ measurement, DRSRQ=N×DRSRP/DRSSI, where N is the number of RB's of the DRSSI measurement bandwidth.

Within a DRS occasion, it may be difficult for a UE to determine whether a subframe is a regular DL subframe (i.e., a non-MBSFN downlink subframe), an MBSFN subframe, a special subframe, or UL subframe for CRS based measurement. Conventional 2-bit NeighCellConfig signaling does not explicitly indicate whether a subframe in a neighboring cell is a DL subframe or UL subframe when NeighCellConfig is set to the value '11'.

For example, the value '11' simply indicates that the neighbor cell is of a different TDD DL/UL subframe configuration without indicating the actual configuration of the neighboring cell. Furthermore, conventional 2-bit signaling does not explicitly indicate whether a subframe in a neighboring cell is an MBSFN subframe or not when NeighCellConfig is set to the value '00', '01', or '11'. For example, the value '00' simply indicates that the neighboring cell has a different configuration from the serving cell, the value '01' indicates that the neighboring cell may still have a subset of MBSFN subframes as the serving cell, and the value '11' does not specify the MBSFN configuration of neighboring cells (since the TDD configuration may already be different). It should be noted that no indication of the neighboring cell's special subframe configuration is provided to the UE. Special subframe configurations may have different DwPTS symbols and, therefore, different presence of CRS symbols. Moreover, there is no connection between a subframe direction (e.g., UL or DL or a special subframe) and a CSI-RS configuration in DRS.

In an aspect, a UE may be configured to assume that a subframe is either a DL subframe, a subframe including a DwPTS, or an MBSFN subframe, based on: an N number of subframes configured for a DRS occasion (e.g., where N=2, 3, 4, 5) for a carrier frequency, the indicated NeighCellConfig for a carrier frequency, the TDD configuration of the serving cell, the CSI-RS configuration for a cell, the DwPTS configuration of the serving cell, and/or the SSS subframe index for a carrier frequency. The SSS subframe index may be either 0 or 5, since SSS is the first subframe in a DRS occasion. For example, the subframe index may represent the subframe (e.g., subframe 0 or subframe 5 in a frame) which includes SSS.

For a carrier frequency, a UE may be indicated a value N for the carrier frequency, common to all cells. The UE may be indicated a list of CRSs, and, if configured, a list of CSI-RS configurations. Each CSI-RS may be associated with a CRS in the CRS list. For example, a CRS configuration may be associated with one or more CSR-RS configurations, while a CSI-RS configuration may be specific to a particular CRS configuration.

An example UE determination as to whether a CRS is present in one or more subframes of a DRS duration for a neighbor cell will now be discussed. By determining the presence of a CRS in one or more subframes, the UE may perform CRS based measurements of neighbor cells in those one or more subframes. In the present example, N=3 and the DRS occasion begins at subframe 0. With reference to FIG.

11, for all TDD configurations, the first three subframes (e.g., subframes 0, 1, and 2) are D, S, and U, respectively. Therefore, the UE may assume that the first three subframes are D, S, and U, regardless of the 2-bit value of NeighCellConfig. The UE may also consider this scenario as a mis-configuration, since the last subframe of the three subframes (e.g., subframe 3) is U, which cannot be used for measurement. For the special subframe S (e.g., subframe 1), depending on the UE implementation, the UE may assume that subframe 1 is the same special subframe configuration as the serving cell, or a configuration with the shortest DwPTS length.

The UE may be configured not to expect a CSI-RS configuration in the U subframe (e.g., subframe 2). In an aspect, CSI-RS may not be configured in a special subframe. In another aspect, CSI-RS may be allowed in a special subframe. In such aspect, the UE may assume a DwPTS length in the special subframe based on the CSI-RS configuration instead of assuming the shortest DwPTS length. For example, if the CSI-RS configuration is such that CSI-RS is present in symbols 2 and 3 of the second slot of the special subframe 5, the UE may assume that CRS is present in symbols 0/1 of the first slot and symbols 0/1 of the second slot (hence 4 CRS symbols in DwPTS). Alternatively stated, the last CSI-RS symbol may be used to determine a lower bound for determining CRS symbol presence.

Another example UE determination as to whether a CRS is present in one or more subframes of a DRS duration for a neighbor cell will now be discussed. In the present example, N=3 and the DRS occasion begins at subframe 5. With reference to FIG. 11, based on existing TDD configurations, the three subframes (e.g., subframes 5, 6, and 7) may be D, S, and U respectively, or D, D, and D, respectively. Therefore, the UE may determine the subframe types for subframes 6 and 7 of the neighbor cell based on NeighCellConfig, the type of subframe 6 of the serving cell (e.g., S or D), and the type of subframe 7 of the serving cell (e.g., non-MBSFN or MBSFN or U). It should be noted that the UE may assume the subframe type of subframe 5 as being D regardless of the NeighCellConfig. This assumes that a MBSFN subframe may be configured in subframe 0, 1, 5, and 6 in a TDD system. Table 1 below indicates the possible 2-bit values of NeighCellConfig (e.g., in the far left column) and the corresponding subframe types (e.g., in the far right column) assumed by the UE for subframes 5, 6, and 7.

TABLE 1

| NeighCellConfig | Serving Cell Subframe 6 Configuration | Serving Cell Subframe 7 Configuration | Assumed subframe configuration for DRS |
| --- | --- | --- | --- |
| 11(different TDD config) | S or D | any | DSU |
| 00(same TDD config, but different MBSFN config) | S | any | DSU |
|  | D | any | DDM, where M stands for MBSFN subframe |
| 01(same TDD config, same or subset MBSFN configuration) | S | any | DSU |
|  | D | MBSFN | DDM |
|  | D | Non-MBSFN | DDD |
| 10(same TDD, no MBSFN) | S | any | DSU |
|  | D | any | DDD |

The UE may further determine the type of subframe of a neighbor cell based on whether or not a subframe in the DRS occasion contains at least a CSI-RS configuration for the neighbor cell. If a CSI-RS configuration is in a subframe for the neighbor cell, the type of the subframe may be determined to be a DL subframe or an MBSFN subframe for the neighbor cell, rather than a UL subframe. For example, for a neighbor cell without a CSI-RS configuration in subframe 7, Table 1 above may apply.

For a cell with a CSI-RS configuration in subframe 7, however, the subframe type of subframe 7 may be a DL subframe (e.g., MBSFN subframe or non-MBSFN subframe depending on NeighCellConfig) as shown below in Table 2.

Table 2 indicates the possible 2-bit values of NeighCellConfig (e.g., in the far left column) and the corresponding subframe types (e.g., in the far right column) assumed by the UE for subframes 5, 6, and 7.

When NeighCellConfig is 11, neighboring cell may have different TDD subframe configurations compared with the serving cell. As a result, subframe 6 in the neighboring cells may be a special subframe or a regular downlink subframe, while subframe 7 may be a regular downlink or uplink subframe. Without any other information, the UE may only assume a DSM configuration for subframes, 5, 6 and 7 in determining CRS presence. This is indicated with an asterisk in Table 2.

However, in an aspect, if a CSI-RS configuration is not allowed in special subframes, and the UE is configured with CSI-RS in subframe 6, the UE may assume that subframes 5, 6, and 7 are D, D, and M, respectively, since subframe 6 must be a regular DL subframe due to the CSI-RS configuration. In another aspect, if the CSI-RS configuration is allowed in special subframes and CSI-RS is configured in subframe 6, the number of CRS symbols may be determined based on the last CSI-RS symbol for the cell. For example, the CSI-RS configuration may be a non-zero-power CSI-RS, zero power CSI-RS, or a combination thereof.

TABLE 2

| NeighCellConfig | Serving Cell Subframe 6 Configuration | Serving Cell Subframe 7 Configuration | Assumed subframe config for DRS |
| --- | --- | --- | --- |
| 11(different TDD config) | S | any | DSM* |
|  | D | any | DSM* |
| 00(same TDD config, but different MBSFN config) | S | any | DSU |
|  | D | any | DDM, where M stands for MBSFN subframe |
| 01(same TDD config, same or subset MBSFN configuration) | S | any | DSU |
|  | D | MBSFN | DDM |
|  | D | Non-MBSFN | DDD |
| 10(same TDD, no MBSFN) | S | any | DSU |
|  | D | any | DDD |

The aspects discussed supra may help to improve DRS measurement performance, however, at the expense of increased complexity. To reduce such complexity, configurations where the DRS occasion begins at subframe 0 may not be supported, configurations with the last subframe as a UL subframe when the neighboring cell has the same TDD configuration as the serving cell may not be supported, the UE may be configured to always assume the special configuration with one CRS symbol only, and/or CSI-RS may not be supported in special subframes.

Figure 13A:
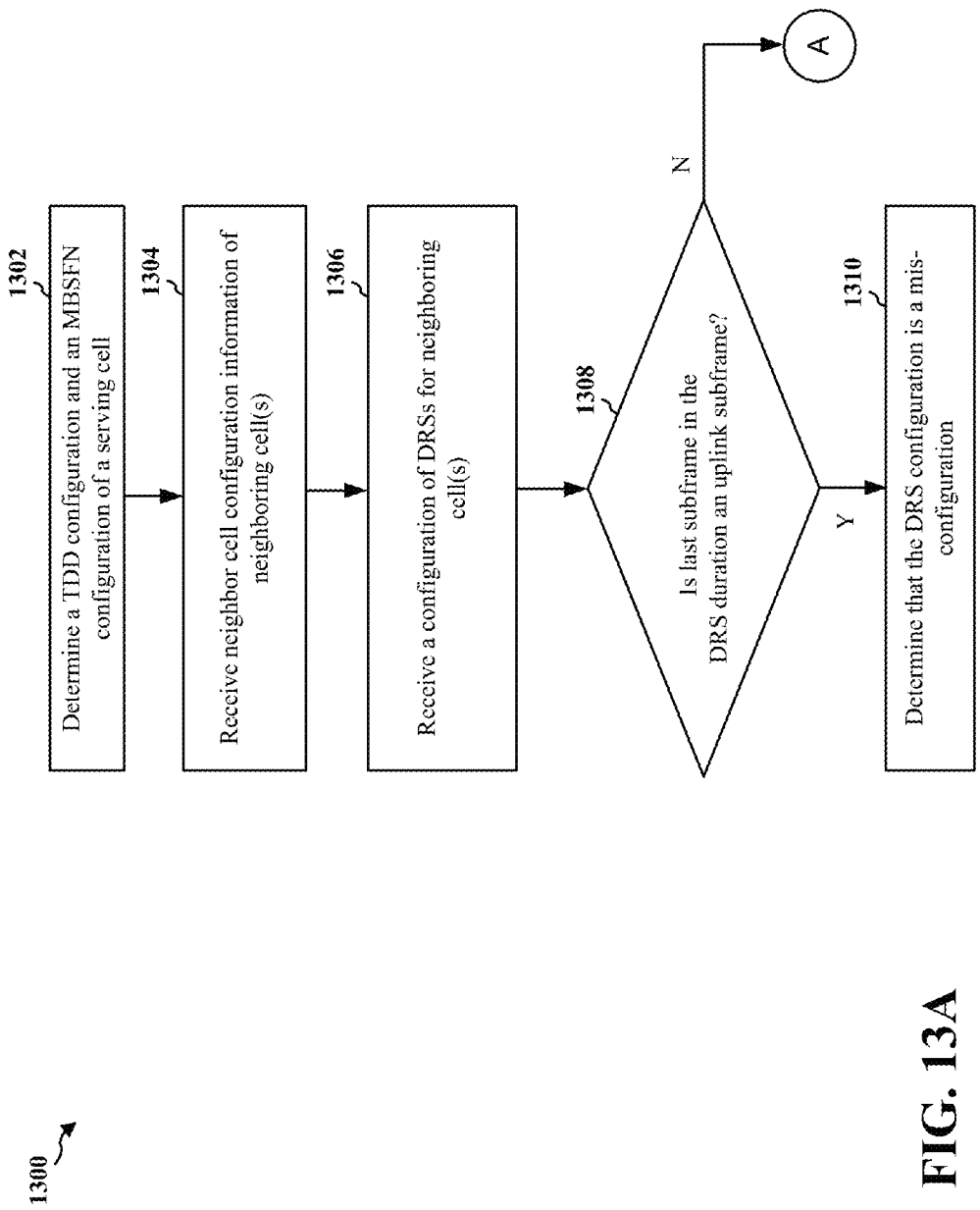
FIGS. 13A and 13B are a flow chart of a method of wireless communication.
Figure 13B:
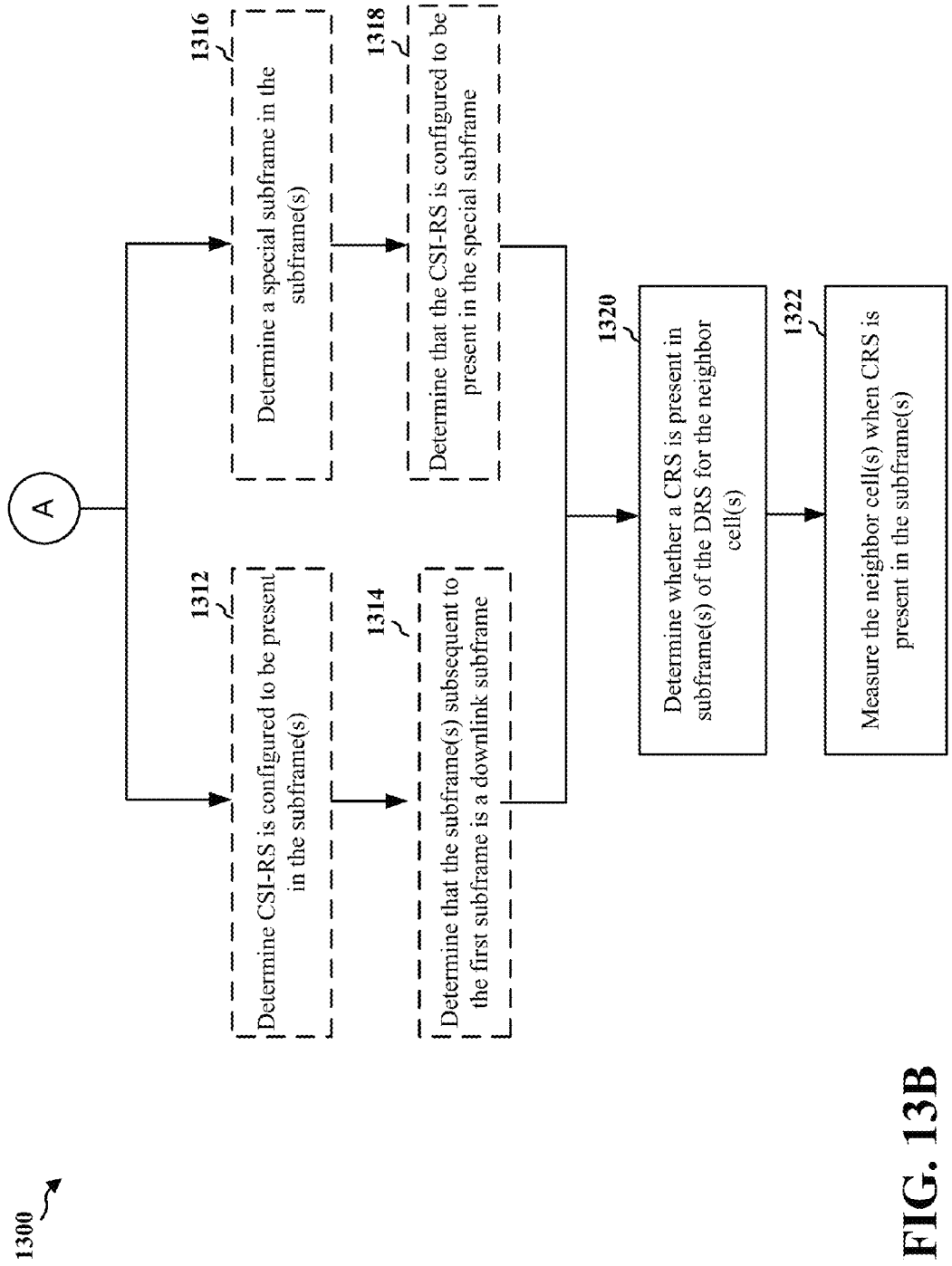

FIGS. 13A and 13B are a flow chart 1300 of a method of wireless communication. The method may be performed by a UE (e.g., the UE 102, the apparatus 1402/1402'). It should be understood that the steps indicated with dotted lines represent optional steps.

At step 1302, the UE determines a TDD configuration and an MBSFN configuration of a serving cell. In an aspect, such configuration of the serving cell may be signaled to the UE from the serving cell or may be preconfigured and stored in the UE.

At step 1304, the UE receives neighbor cell configuration information indicating a TDD configuration and/or an MBSFN configuration of one or more neighboring cells.

At step 1306, the UE receives a configuration of DRSs for at least one of the one or more neighboring cells. The configuration may include at least a starting subframe index for the DRS. In addition to the starting subframe index for the DRS, the configuration may also include a duration of the DRS. For example, for a carrier frequency, a UE may receive a DRS duration value indicating N subframes, common to multiple cells. In an aspect, the received configuration of DRSs may further include at least one of a CSI-RS configuration for at least one of the one or more neighbor cells. In an aspect, CSI-RS is at least one of a non-zero-power CSI-RS or a zero-power CSI-RS. In an aspect, CSI-RS is prohibited from being present in a special subframe.

At step 1308, the UE determines whether a last subframe in the DRS duration is an uplink subframe or identifies whether the starting subframe index of the DRS is subframe 0 of a frame. If either the last subframe in the DRS duration is an uplink subframe or the starting subframe index of the DRS is subframe 0, then at step 1310, the UE determines that the DRS configuration is a mis-configuration.

If the last subframe in the DRS duration is not an uplink subframe (step 1308), then at step 1312 (in FIG. 13B), the UE determines that CSI-RS is configured to be present in at least one of the one or more subframes. At step 1314, the UE determines that one or more subframes subsequent to the first subframe is a downlink subframe. In an aspect, the first subframe is subframe 6 of a frame.

Alternatively, if the last subframe in the DRS duration is not an uplink subframe (step 1308), then at step 1316, the UE determines a special subframe in the one or more subframes. Then at step 1318, the UE determines that the CSI-RS is configured to be present in the special subframe. In an aspect, the determination as to whether the CRS is present in the special subframe may be based on a last symbol containing CSI-RS in the special subframe.

At step 1320, the UE determines whether a CRS is present in one or more subframes of the duration of the DRS for the at least one of the one or more neighbor cells based on the received neighbor cell configuration information, the TDD configuration and the MBSFN configuration of the serving cell, the starting subframe index for the DRS, and/or the duration of the DRS. In an aspect, when CSI-RS is configured to be present in at least one of the one or more subframes, the UE determines that the CRS is present in the at least one of the one or more subframes. In another aspect, the determination as to whether the CRS is present is further based on the CSI-RS configuration, where at least one CSI-RS in the CSI-RS configuration is associated with the at least one of the one or more neighbor cells.

Finally, at step 1322, the UE measures the at least one of the one or more neighbor cells based on the determined presence of CRS in the one or more subframes. Thus, the UE performs CRS based measurement for a neighbor cell when the UE determines that a CRS is present in at least one of the subframes of the neighbor cell's DRS.

The aspects presented in FIGS. 13A and 13B improve the ability of the UE in performing CRS based measurements for neighbor cells by enabling the UE to determine whether a CRS is present in a DRS for a neighbor cell using, for example, a DRS configuration for the neighbor cell, neighbor cell configuration information, information for the serving cell such as a TDD or configuration, CSI-RS configuration for a cell, and/or a SSS subframe index for a carrier frequency.

Figure 14:
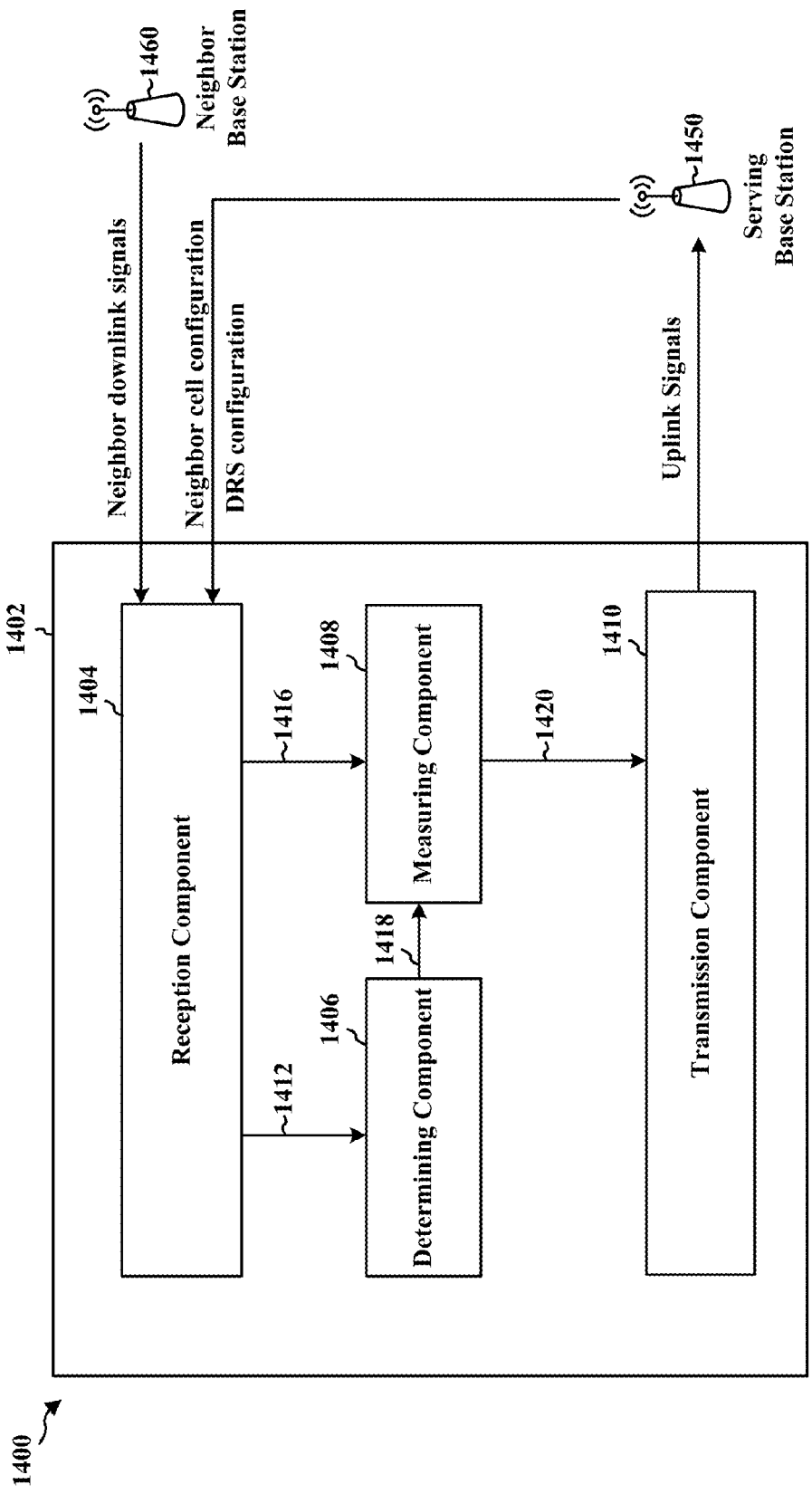
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be a UE. The apparatus includes a reception component 1404 that receives neighbor cell configuration information indicating at least one of a TDD configuration and an MBSFN configuration of one or more neighboring cells (e.g., neighbor base station 1460), and further receives a configuration of DRSs for at least one of the one or more neighboring cells, where the configuration includes at least a starting subframe index for the DRS and a duration of the DRS. The apparatus further includes a determining component 1406. The reception component 1404 may provide the received configuration information 1412 (e.g., neighbor cell configuration information and/or DRS configuration) to the determining component 1406. The determining component 1406. For example, the determining component may determine a TDD configuration and an MBSFN configuration of a serving cell (e.g., serving base station 1450). The determining component also may determine, e.g., using the TDD configuration and MBSFN configuration for the serving cell and the information for the neighbor cell received at the reception component 1404 to determine whether a last subframe in the DRS duration is an uplink subframe, determine that the DRS configuration is a mis-configuration when the last subframe in the DRS duration is an uplink subframe or when the starting subframe index of the DRS is subframe 0 of a frame, determine CSI-RS is configured to be present in at least one of the one or more subframes, determine a special subframe in the one or more subframes, determine that the CSI-RS is configured to be present in the special subframe, determines that one or more subframes subsequent to the first subframe is a downlink subframe, and determine whether a CRS is present in one or more subframes of the duration of the DRS for the at least one of the one or more neighbor cells based on at least one of the received neighbor cell configuration information, the TDD configuration and the MBSFN configuration of the serving cell, the starting subframe index for the DRS, and the duration of the DRS. The apparatus further includes a measuring component 1408 that receives one or more of the determinations 1418 of the determining component 1406 and measures the downlink signals 1416 of the at least one of the one or more neighbor cells based on the determined presence of CRS in the one or more subframes. The apparatus further includes a transmission component 1410 that transmits uplink signals to a serving base station 1450 based on the measurements 1420 of neighbor cells.

The apparatus may include additional component that perform each of the steps of the algorithm in the aforementioned flow chart of FIGS. 13A and 13B. As such, each step in the aforementioned flow chart of FIGS. 13A and 13B may be performed by a component and the apparatus may include one or more of those components. The component may be one or more hardware components specifically configured to carry out the stated processes/algorithm, implemented by a processor configured to perform the stated processes/algorithm, stored within a computer-readable medium for implementation by a processor, or some combination thereof.

Figure 15:
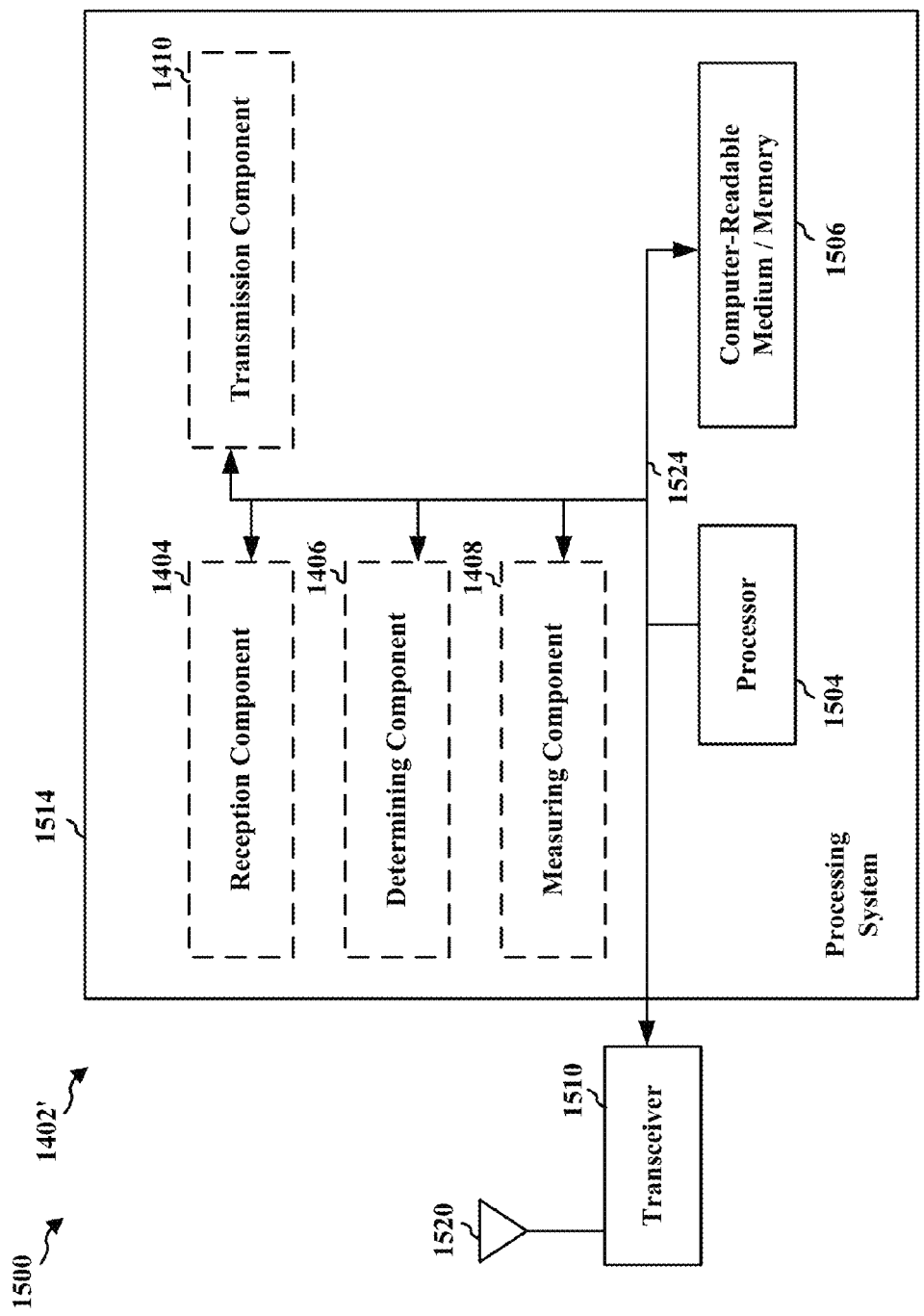
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware component, represented by the processor 1504, the components 1404, 1406, 1408, and 1410, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1410, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system further includes at least one of the components 1404, 1406, 1408, and 1410. The components may be software components running in the processor 1504, resident/stored in the computer readable medium/memory 1506, one or more hardware components coupled to the processor 1504, or some combination thereof. The processing system 1514 may be a component of the UE 650 and may include the memory 660 and/or at least one of the TX processor 668, the RX processor 656, and the controller/processor 659.

In one configuration, the apparatus 1402/1402' for wireless communication includes means for determining a TDD configuration and an MBSFN configuration of a serving cell, means for receiving neighbor cell configuration information indicating at least one of a TDD configuration and an MBSFN configuration of one or more neighboring cells, means for receiving a configuration of DRSs for at least one of the one or more neighboring cells, wherein the configuration comprises at least a starting subframe index for the DRS and a duration of the DRS, means for determining whether a CRS is present in one or more subframes of the duration of the DRS for the at least one of the one or more neighbor cells based on at least one of the received neighbor cell configuration information, the TDD configuration and the MBSFN configuration of the serving cell, the starting subframe index for the DRS, and the duration of the DRS, means for measuring the at least one of the one or more neighbor cells based on the determined presence of CRS in the one or more subframes, means for determining that CSI-RS is configured to be present in at least one of the one or more subframes, means for determining a special subframe in the one or more subframes, means for determining that the CSI-RS is configured to be present in the special subframe, means for determining that one or more subframes subsequent to the first subframe is a downlink subframe, means for determining whether a last subframe in the DRS duration is an uplink subframe, means for identifying whether the starting subframe index of the DRS is subframe 0 of a frame, means for determining that the DRS configuration is a mis-configuration when the last subframe is determined to be an uplink frame or when the starting subframe index of the DRS is identified as subframe 0 of the frame. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:
1. A method of wireless communication comprising:
   determining a time division duplex (TDD) configuration and a multicast-broadcast single-frequency network (MBSFN) configuration of a serving cell;
   receiving a two-bit neighbor cell configuration information indicating at least one of a TDD configuration and an MBSFN configuration of one or more neighboring cells relative to the TDD configuration and MBSFN configuration of the serving cell;
receiving a configuration of a discovery reference signal (DRS) for at least one of the one or more neighboring cells, wherein the configuration comprises at least a starting subframe index for the DRS; and
determining whether a common reference signal (CRS) is present in one or more subframes of a duration of the DRS for the at least one of the one or more neighboring cells based on the received two-bit neighbor cell configuration information, the TDD configuration and the MBSFN configuration of the serving cell, and the starting subframe index for the DRS.

2. The method of claim 1, further comprising measuring the at least one of the one or more neighboring cells when the CRS is determined to be present in the one or more subframes.

3. The method of claim 1, wherein the received configuration of DRS further indicates at least one of a channel state information reference signal (CSI-RS) configuration for the at least one of the one or more neighboring cells.

4. The method of claim 3, wherein the determining whether the CRS is present is further based on the CSI-RS configuration.

5. The method of claim 4, wherein at least one CSI-RS in the CSI-RS configuration is associated with the at least one of the one or more neighboring cells.

6. The method of claim 4, further comprising determining CSI-RS is configured to be present in at least one of the one or more subframes,
wherein the determining comprises determining that the CRS is present in the at least one of the one or more subframes.

7. The method of claim 4, further comprising:
determining a special subframe in the one or more subframes; and
determining that the CSI-RS is configured to be present in the special subframe,
wherein the determining whether the CRS is present comprises determining that the CRS is present in the special subframe based on a last symbol containing CSI-RS in the special subframe.

8. The method of claim 3, wherein CSI-RS is at least one of a non-zero-power CSI-RS or a zero-power CSI-RS.

9. The method of claim 3, wherein CSI-RS is prohibited from being present in a special subframe.

10. The method of claim 9, wherein the configuration comprises the duration of the DRS, and
wherein CSI-RS is configured to be present in a first subframe in the indicated duration of the DRS, further comprising determining that one or more subframes subsequent to the first subframe is a downlink subframe.

11. The method of claim 10, wherein the first subframe is subframe 6 of a frame.

12. The method of claim 1, wherein the configuration comprises the duration of the DRS, the method further comprising:
determining whether a last subframe in the duration of the DRS is an uplink subframe; and
determining that the DRS configuration is a mis-configuration, when the last subframe in the DRS duration is determined to be an uplink subframe.

13. The method of claim 1, wherein the two-bit neighbor cell configuration information indicates whether the TDD configuration of the one or more neighboring cells is different than the TDD configuration of the serving cell.

14. The method of claim 1, wherein the two-bit neighbor cell configuration information indicates whether the TDD configuration of the one or more neighboring cells is different than the TDD configuration of the serving cell without indicating the actual TDD configuration of the one or more neighboring cells.

15. An apparatus for wireless communication, comprising:
means for determining a time division duplex (TDD) configuration and a multicast-broadcast single-frequency network (MBSFN) configuration of a serving cell;
means for receiving a two-bit neighbor cell configuration information indicating at least one of a TDD configuration and an MBSFN configuration of one or more neighboring cells relative to the TDD configuration and MBSFN configuration of the serving cell;
means for receiving a configuration of a discovery reference signal (DRS) for at least one of the one or more neighboring cells, wherein the configuration comprises at least a starting subframe index for the DRS; and
means for determining whether a common reference signal (CRS) is present in one or more subframes of a duration of the DRS for the at least one of the one or more neighboring cells based on the received two-bit neighbor cell configuration information, the TDD configuration and the MBSFN configuration of the serving cell, and the starting subframe index for the DRS.

16. The apparatus of claim 15, further comprising means for measuring the at least one of the one or more neighboring cells when the CRS is determined to be present in the one or more subframes.

17. The apparatus of claim 15, wherein the received configuration of DRS further indicates at least one of a channel state information reference signal (CSI-RS) configuration for the at least one of the one or more neighboring cells, and
wherein the means for determining is configured to determine whether the CRS is present further based on the CSI-RS configuration, wherein at least one CSI-RS in the CSI-RS configuration is associated with the at least one of the one or more neighboring cells.

18. The apparatus of claim 17, further comprising means for determining that CSI-RS is configured to be present in at least one of the one or more subframes, wherein the means for determining is configured to determine that CRS is present in the at least one of the one or more subframes.

19. The apparatus of claim 17, further comprising:
means for determining a special subframe in the one or more subframes; and
means for determining that the CSI-RS is configured to be present in the special subframe,
wherein the means for determining is configured to determine that the CRS is present in the special subframe based on a last symbol containing CSI-RS in the special subframe.

20. The apparatus of claim 17, wherein CSI-RS is prohibited from being present in a special subframe,
wherein the configuration comprises the duration of the DRS, and
wherein CSI-RS is configured to be present in a first subframe, further comprising means for determining that one or more subframes subsequent to the first subframe is a downlink subframe.

21. The apparatus of claim 20, wherein the first subframe is subframe 6 of a frame.

22. The apparatus of claim 15, wherein the configuration comprises the duration of the DRS, the means for determining further being configured to determine whether a last subframe in the duration of the DRS is an uplink subframe and to determine that the DRS configuration is a mis-configuration when the last subframe is determined to be an uplink frame.

23. An apparatus for wireless communication, comprising:
   a memory; and
   at least one processor coupled to the memory and configured to:
      determine a time division duplex (TDD) configuration and a multicast-broadcast single-frequency network (MBSFN) configuration of a serving cell;
      receive a two-bit neighbor cell configuration information indicating at least one of a TDD configuration and an MBSFN configuration of one or more neighboring cells relative to the TDD configuration and MBSFN configuration of the serving cell;
      receive a configuration of a discovery reference signal (DRS) for at least one of the one or more neighboring cells, wherein the configuration comprises at least a starting subframe index for the DRS; and
      determine whether a common reference signal (CRS) is present in one or more subframes of a duration of the DRS for the at least one of the one or more neighboring cells based on the received two-bit neighbor cell configuration information, the TDD configuration and the MBSFN configuration of the serving cell, and the starting subframe index for the DRS.

24. The apparatus of claim 23, the at least one processor further configured to measure the at least one of the one or more neighboring cells when the CRS is determined to be present in the one or more subframes.

25. The apparatus of claim 23, wherein the received configuration of DRS further indicates at least one of a channel state information reference signal (CSI-RS) configuration for the at least one of the one or more neighboring cells, and
   wherein the at least one processor is further configured to determine a presence of CRS in the one or more subframes for the at least one of the one or more neighboring cells based on the CSI-RS configuration, wherein at least one CSI-RS in the CSI-RS configuration is associated with the at least one of the one or more neighboring cells.

26. The apparatus of claim 25, the at least one processor further configured to:
   determine CSI-RS is configured to be present in at least one of the one or more subframes; and
   determine that CRS is present in the at least one of the one or more subframes.

27. The apparatus of claim 25, the at least one processor further configured to:
   determine a special subframe in the one or more subframes;
   determine that the CSI-RS is configured to be present in the special subframe; and
   determine that the CRS is present in the special subframe based on a last symbol containing CSI-RS in the special subframe.

28. The apparatus of claim 25, wherein CSI-RS is at least one of a non-zero-power CSI-RS or a zero-power CSI-RS.

29. The apparatus of claim 25, wherein CSI-RS is prohibited from being present in a special subframe,
   wherein the configuration comprises the duration of the DRS, and
   wherein CSI-RS is configured to be present in a first subframe, the at least one processor further configured to determine that one or more subframes subsequent to the first subframe is a downlink subframe.

30. The apparatus of claim 29, wherein the first subframe is subframe 6 of a frame.

31. The apparatus of claim 23, wherein the configuration comprises the duration of the DRS, the at least one processor further configured to:
   determine whether a last subframe in the duration of the DRS is an uplink subframe; and
   determine that the DRS configuration is a mis-configuration when the last subframe is determined to be an uplink frame.

32. A non-transitory computer-readable medium storing computer executable code for wireless communication, comprising code for:
   determining a time division duplex (TDD) configuration and a multicast-broadcast single-frequency network (MBSFN) configuration of a serving cell;
   receiving a two-bit neighbor cell configuration information indicating at least one of a TDD configuration and an MBSFN configuration of one or more neighboring cells relative to the TDD configuration and MBSFN configuration of the serving cell;
   receiving a configuration of a discovery reference signal (DRS) for at least one of the one or more neighboring cells, wherein the configuration comprises at least a starting subframe index for the DRS; and
   determining whether a common reference signal (CRS) is present in one or more subframes of a duration of the DRS for the at least one of the one or more neighboring cells based on the received two-bit neighbor cell configuration information, the TDD configuration and the MBSFN configuration of the serving cell, and the starting subframe index for the DRS.

* * * * *